US012763419B2

(12) United States Patent
Yamanaka

(10) Patent No.: US 12,763,419 B2
(45) Date of Patent: Oct. 13, 2026

(54) POWER STORAGE DEVICE

(71) Applicant: TOYOTA JIDOSHA KABUSHIKI KAISHA, Toyota (JP)

(72) Inventor: Atsushi Yamanaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 468 days.

(21) Appl. No.: 18/411,862

(22) Filed: Jan. 12, 2024

(65) Prior Publication Data

US 2024/0274959 A1 Aug. 15, 2024

(30) Foreign Application Priority Data

Feb. 10, 2023 (JP) ................................ 2023-019210

(51) Int. Cl.
*H01M 50/264* (2021.01)
*H01M 50/209* (2021.01)
*H01M 50/514* (2021.01)

(52) U.S. Cl.
CPC ....... *H01M 50/264* (2021.01); *H01M 50/209* (2021.01); *H01M 50/514* (2021.01)

(58) Field of Classification Search
CPC . H01M 50/209; H01M 50/264; H01M 50/514
See application file for complete search history.

(56) References Cited

FOREIGN PATENT DOCUMENTS

| | | | |
|---|---|---|---|
| CN | 218070041 U | * | 12/2022 |
| JP | 2014-157721 A | | 8/2014 |
| JP | 2019-216073 A | | 12/2019 |

OTHER PUBLICATIONS

Machine translation of JP 2019216073 A, Hase Yusuke. (Year: 2019).*
Machine translation of CN-218070041-U, Zhang, Zhao-hong. (Year: 2022).*

* cited by examiner

*Primary Examiner* — Mayla Gonzalez Ramos
(74) *Attorney, Agent, or Firm* — Sughrue Mion, PLLC

(57) ABSTRACT

A power storage device includes: a plurality of power storage modules; a conductive member; a pair of restraint members; and an adhesive member. Each power storage module includes: an overlapping region that overlaps with the pair of restraint members in a stacking direction; and a non-overlapping region that does not overlap with the pair of restraint members in the stacking direction. Each power storage module includes: a direct contact region that is in direct contact with the conductive member; and an indirect contact region that is in contact with the power storage module adjacent to that power storage module or the conductive member, with the adhesive member interposed therebetween. The overlapping region includes the direct contact region, and the non-overlapping region includes the indirect contact region.

5 Claims, 4 Drawing Sheets

POWER STORAGE DEVICE

CROSS REFERENCE TO RELATED APPLICATIONS

This nonprovisional application is based on Japanese Patent Application No. 2023-019210 filed on Feb. 10, 2023 with the Japan Patent Office, the entire contents of which are hereby incorporated by reference.

BACKGROUND

Field

The present disclosure relates to a power storage device.

Description of the Background Art

Japanese Patent Laying-Open No. 2019-216073 discloses a power storage device including a power storage module stack formed by stacking a plurality of power storage modules with conductive plates interposed therebetween, and a restraint portion that applies a restraining load to the power storage module stack. The restraint portion includes a pair of restraint plates that sandwich the power storage module stack in a stacking direction. Each of the restraint plates is formed by a rectangular plate having an area that is one size larger than an area of the power storage modules and the conductive plates when viewed from the stacking direction.

SUMMARY

In the power storage device described in Japanese Patent Laying-Open No. 2019-216073, as an electrode in each power storage module increases in size, the device as a whole increases in size. Therefore, the mass of the restraint portion increases remarkably.

An object of the present disclosure is to provide a power storage device that allows a reduction in mass of a restraint member.

A power storage device according to an aspect of the present disclosure includes: a plurality of power storage modules stacked on top of each other, each of the plurality of power storage modules including a plurality of stacked electrodes; a conductive member provided between a pair of the power storage modules adjacent to each other, to bring the pair of the power storage modules into conduction; a pair of restraint members that restrain the plurality of power storage modules and the conductive member from both sides in a stacking direction of the plurality of power storage modules; and an adhesive member that bonds the power storage module and the conductive member, wherein the plurality of power storage modules include: an overlapping region that overlaps with the pair of restraint members in the stacking direction; and a non-overlapping region that does not overlap with the pair of restraint members in the stacking direction, each power storage module includes: a direct contact region that is in direct contact with the conductive member; and an indirect contact region that is in contact with the power storage module adjacent to that power storage module or the conductive member, with the adhesive member interposed therebetween, the overlapping region includes the direct contact region, and the non-overlapping region includes the indirect contact region.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
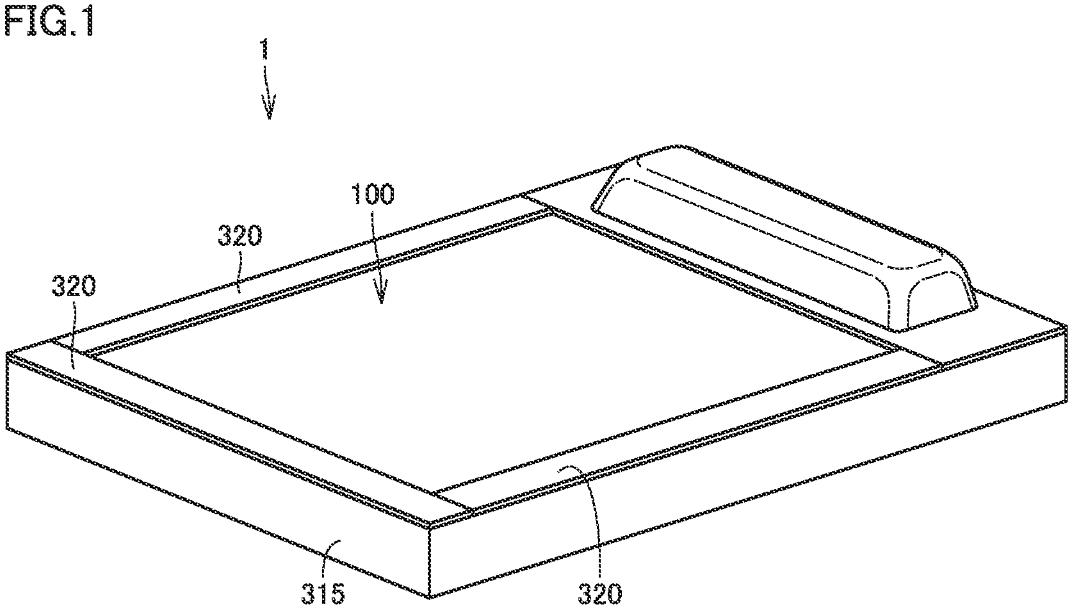
FIG. 1 is a perspective view schematically showing a power storage device according to an embodiment of the present disclosure.

An embodiment of the present disclosure will be described with reference to the drawings. In the drawings referenced below, the same or corresponding members are denoted by the same reference numerals.

Figure 2:
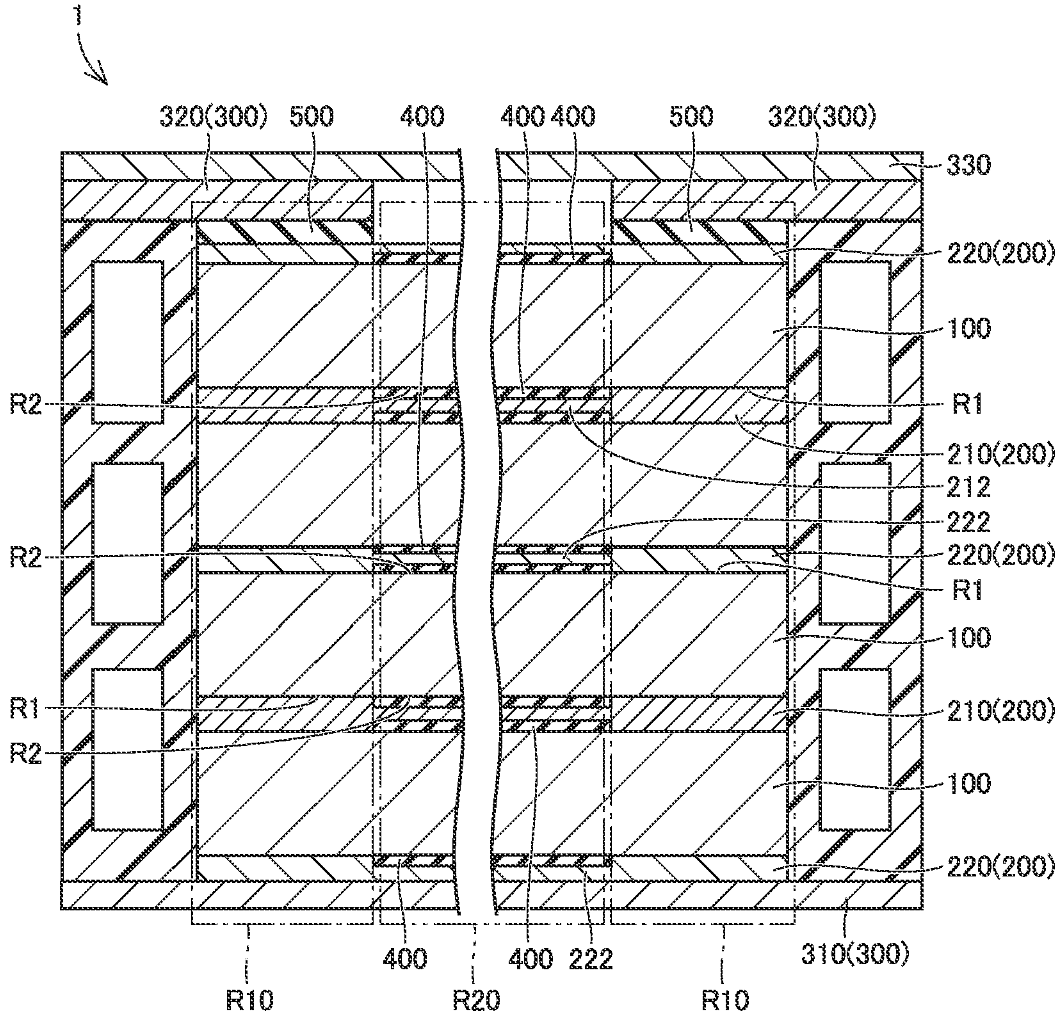
FIG. 2 is a cross-sectional view taken along line II-II in FIG. 1.

FIG. 1 is a perspective view schematically showing a power storage device according to an embodiment of the present disclosure. FIG. 2 is a cross-sectional view taken along line II-II in FIG. 1. As shown in FIGS. 1 and 2, a power storage device 1 includes a plurality of power storage modules 100, a plurality of conductive members 200, a pair of restraint members 300, an adhesive member 400, and an elastic member 500.

The plurality of power storage modules 100 are stacked on top of each other. In the example shown in FIG. 2, the plurality of power storage modules 100 include four power storage modules 100. Each power storage module 100 is formed to have a rectangular outer shape in a plan view. Each power storage module 100 includes a plurality of stacked electrodes.

Figure 3:
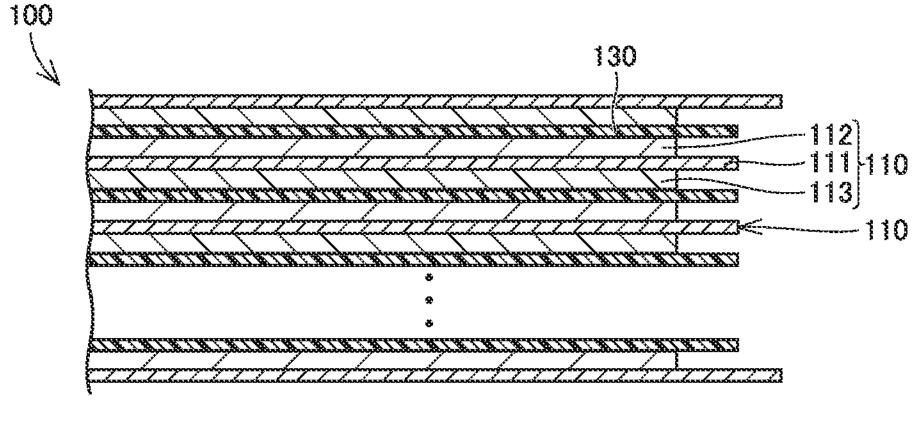
FIG. 3 is a cross-sectional view schematically showing a bipolar electrode.

Each electrode may be implemented by a bipolar electrode 110 shown in FIG. 3. Bipolar electrode 110 includes a current-collecting foil 111, a positive electrode active material layer 112 provided on one surface of current-collecting foil 111, and a negative electrode active material layer 113 provided on the other surface of current-collecting foil 111. In this case, power storage module 100 is formed by alternately stacking bipolar electrode 110 and a separator 130.

Figure 4:
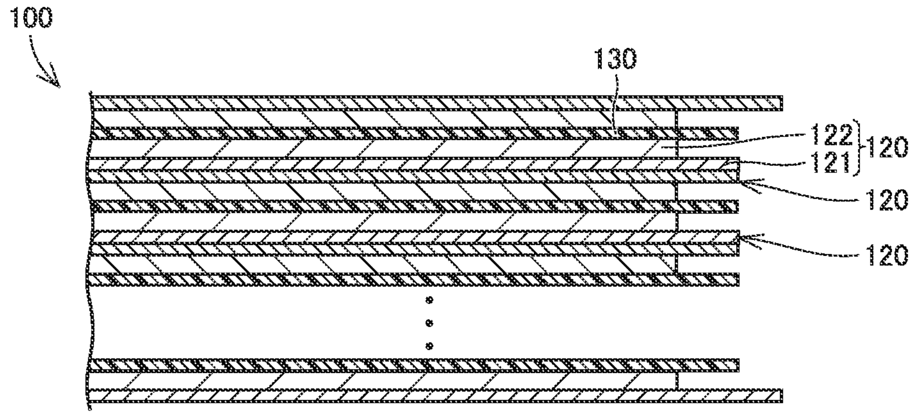
FIG. 4 is a cross-sectional view schematically showing a monopolar electrode.

Alternatively, each electrode may be implemented by a monopolar electrode 120 shown in FIG. 4. Positive electrode monopolar electrode 120 or negative electrode monopolar electrode 120 includes a current-collecting foil 121, and an active material layer 122 provided on current-collecting foil 121. In this case, power storage module 100 is formed by stacking positive electrode monopolar electrode 120 and negative electrode monopolar electrode 120 with separator 130 interposed therebetween.

As shown in FIGS. 2 to 4, an outermost surface of each power storage module 100 in a stacking direction of the plurality of electrodes is formed by the electrode.

Each conductive member 200 is provided between a pair of power storage modules 100 adjacent to each other. Each conductive member 200 brings the pair of power storage modules 100 into conduction. In the example shown in FIG.

2, the plurality of conductive members 200 include five conductive members 200. In the present embodiment, the plurality of conductive members 200 include two coolers 210 and three current-carrying plates 220.

Each cooler 210 is arranged between power storage module 100 arranged on the outermost side in the stacking direction (vertical direction in FIG. 2) of the plurality of power storage modules 100, of the plurality of power storage modules 100, and power storage module 100 adjacent to that power storage module 100. A flow path through which a coolant (such as water) can flow is provided in cooler 210.

Current-carrying plates 220 are arranged below lowermost power storage module 100, above uppermost power storage module 100, and between second power storage module 100 from the bottom and third power storage module 100 from the bottom. Each current-carrying plate 220 may be formed to have a flat plate shape.

The pair of restraint members 300 restrain the plurality of power storage modules 100 and conductive members 200 from both sides in the stacking direction. The pair of restraint members 300 include a lower restraint member 310 and an upper restraint member 320.

Lower restraint member 310 supports the plurality of power storage modules 100 from the bottom. In the present embodiment, lower restraint member 310 is formed by a bottom portion of a lower case 315 that houses the plurality of power storage modules 100. An outer shape of the bottom portion in a plan view is greater than an outer shape of power storage modules 100 in a plan view. As shown in FIG. 2, power storage device 1 includes an upper case 330 that houses the plurality of power storage modules 100, together with lower case 315. Upper case 330 is not shown in FIG. 1.

Upper restraint member 320 is arranged above the plurality of power storage modules 100. Upper restraint member 320 restrains a peripheral edge portion of the plurality of power storage modules 100 in a plan view. As shown in FIG. 1, upper restraint member 320 is formed to have a rectangular ring shape.

As shown in FIG. 2, the plurality of power storage modules 100 include an overlapping region R10 and a non-overlapping region R20. Overlapping region R10 is a region that overlaps with the pair of restraint members 300 in the stacking direction. In the present embodiment, overlapping region R10 is formed by a region that substantially overlaps with upper restraint member 320 in the stacking direction. Non-overlapping region R20 is a region that does not overlap with the pair of restraint members 300 in the stacking direction. In FIG. 2, overlapping region R10 is indicated by a dashed-and-dotted line, and non-overlapping region R20 is indicated by a dashed-and-double-dotted line.

In the present embodiment, cooler 210 includes a central portion 212 formed in non-overlapping region R20. Current-carrying plate 220 includes a central portion 222 formed in non-overlapping region R20.

Adhesive member 400 bonds power storage module 100 and conductive member 200. Adhesive member 400 may be made of a conductive adhesive, or may be made of an insulating adhesive.

Elastic member 500 is provided between power storage module 100 arranged on the outermost side in the stacking direction, of the plurality of power storage modules 100, and at least one of the pair of restraint members 300. As shown in FIG. 2, elastic member 500 is provided between uppermost power storage module 100 and upper restraint member 320. More specifically, elastic member 500 is provided between current-carrying plate 220 on uppermost power storage module 100 and upper restraint member 320. It is preferable that elastic member 500 should be formed to have such a shape that elastic member 500 is housed in overlapping region R10.

As shown in FIG. 2, each power storage module 100 includes a direct contact region R1 and an indirect contact region R2. Direct contact region R1 is a region of power storage module 100 that is in direct contact with conductive member 200. Indirect contact region R2 is a region of power storage module 100 that is in contact with power storage module 100 adjacent to that power storage module 100 or conductive member 200, with adhesive member 400 interposed therebetween.

Overlapping region R10 includes direct contact region R1. In the present embodiment, overlapping region R10 includes only direct contact region R1. However, overlapping region R10 may include a part of indirect contact region R2. Alternatively, a part of direct contact region R1 may be formed in non-overlapping region R20.

Non-overlapping region R20 includes indirect contact region R2. In the present embodiment, non-overlapping region R20 includes only indirect contact region R2. However, non-overlapping region R20 may include a part of direct contact region R1. Alternatively, a part of indirect contact region R2 may be formed in overlapping region R10.

As described above, in power storage device 1 according to the present embodiment, non-overlapping region R20 is provided, and thus, the mass of restraint members 300 is reduced and the outer shape of power storage device 1 as a whole is also reduced. Furthermore, since overlapping region R10 includes direct contact region R1, electrical conduction between a pair of power storage modules 100 adjacent to each other is ensured. In addition, since non-overlapping region R20 includes indirect contact region R2, a pair of power storage modules 100 adjacent to each other are effectively fixed.

Figure 5:
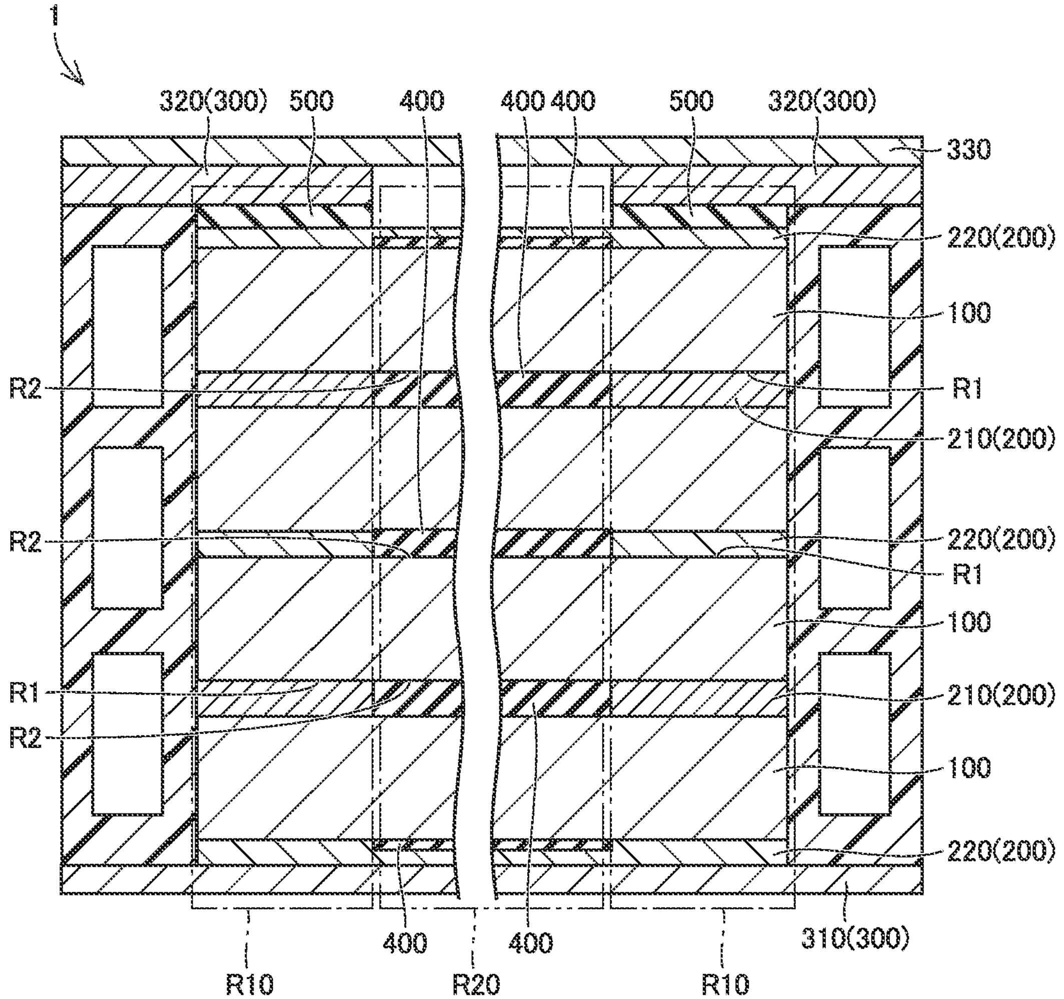
FIG. 5 is a cross-sectional view schematically showing a modification of the power storage device.

In the above-described embodiment, as shown in FIG. 5, conductive member 200 does not necessarily include central portions 212 and 222. In this case, in non-overlapping region R20, power storage modules 100 adjacent to each other are in contact with each other with adhesive member 400 interposed therebetween.

Figure 6:
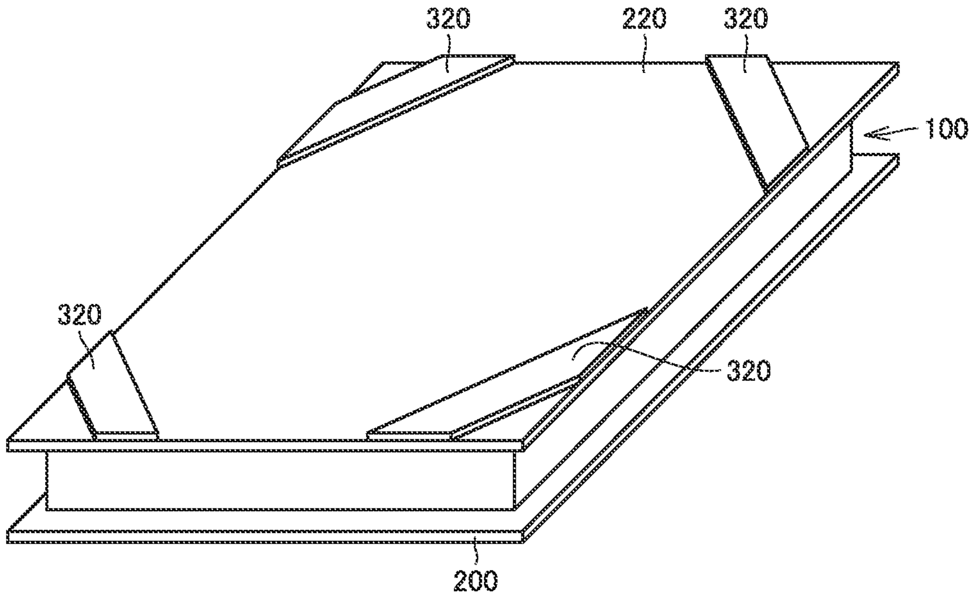
FIG. 6 is a perspective view schematically showing a modification of a restraint member.

In addition, as shown in FIG. 6, the pair of restraint members 300 may restrain four corners of each power storage module 100.

It is understood by those skilled in the art that the illustrative embodiment and example described above are specific examples of the following aspects.

Aspect 1

A power storage device comprising:
- a plurality of power storage modules stacked on top of each other, each of the plurality of power storage modules including a plurality of stacked electrodes;
- a conductive member provided between a pair of the power storage modules adjacent to each other, to bring the pair of the power storage modules into conduction;
- a pair of restraint members that restrain the plurality of power storage modules and the conductive member from both sides in a stacking direction of the plurality of power storage modules; and
- an adhesive member that bonds the power storage module and the conductive member, wherein
- the plurality of power storage modules include:
  - an overlapping region that overlaps with the pair of restraint members in the stacking direction; and a non-overlapping region that does not overlap with the pair of restraint members in the stacking direction, each power storage module includes:

a direct contact region that is in direct contact with the conductive member; and an indirect contact region that is in contact with the power storage module adjacent to that power storage module or the conductive member, with the adhesive member interposed therebetween, the overlapping region includes the direct contact region, and the non-overlapping region includes the indirect contact region.

In this power storage device, the non-overlapping region is provided, and thus, the mass of the restraint members and the outer shape of the power storage device as a whole can be reduced. Furthermore, since the overlapping region includes the direct contact region, electrical conduction between a pair of power storage modules adjacent to each other is ensured. In addition, since the non-overlapping region includes the indirect contact region, a pair of power storage modules adjacent to each other are effectively fixed.

Aspect 2

The power storage device according to Aspect 1, wherein the overlapping region includes only the direct contact region.

In this aspect, electrical conduction between a pair of power storage modules adjacent to each other is ensured more reliably.

Aspect 3

The power storage device according to Aspect 1 or 2, wherein the pair of restraint members restrain a peripheral edge portion of the plurality of power storage modules in a plan view.

In this aspect, even when each power storage module increases in area, the mass of the restraint members and the outer shape of the power storage device as a whole are reduced.

Aspect 4

The power storage device according to Aspect 1 or 2, wherein each power storage module is formed to have a rectangular shape in a plan view, and the pair of restraint members restrain four corners of each power storage module.

In this aspect, even when each power storage module increases in area, the mass of the restraint members and the outer shape of the power storage device as a whole are reduced.

Aspect 5

The power storage device according to any one of Aspects 1 to 4, further comprising an elastic member provided between a power storage module arranged on an outermost side in the stacking direction, of the plurality of power storage modules, and at least one of the pair of restraint members.

In this aspect, a restraining load applied by the restraint members can be adjusted by the elastic member.

Although the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A power storage device comprising:

a plurality of power storage modules stacked on top of each other, each of the plurality of power storage modules including a plurality of stacked electrodes;

a conductive member provided between a pair of the power storage modules adjacent to each other, to bring the pair of the power storage modules into conduction;

a pair of restraint members that restrain the plurality of power storage modules and the conductive member from both sides in a stacking direction of the plurality of power storage modules; and an adhesive member that bonds the power storage module and the conductive member, wherein the plurality of power storage modules include:

an overlapping region that overlaps with the pair of restraint members in the stacking direction; and a non-overlapping region that does not overlap with the pair of restraint members in the stacking direction, each power storage module includes:

a direct contact region that is in direct contact with the conductive member; and an indirect contact region that is in contact with the power storage module adjacent to that power storage module or the conductive member, with the adhesive member interposed therebetween, the overlapping region includes the direct contact region, and the non-overlapping region includes the indirect contact region.

2. The power storage device according to claim 1, wherein the overlapping region includes only the direct contact region.

3. The power storage device according to claim 1, wherein the pair of restraint members restrain a peripheral edge portion of the plurality of power storage modules in a plan view.

4. The power storage device according to claim 1, wherein each power storage module is formed to have a rectangular shape in a plan view, and the pair of restraint members restrain four corners of each power storage module.

5. The power storage device according to claim 1, further comprising an elastic member provided between a power storage module arranged on an outermost side in the stacking direction, of the plurality of power storage modules, and at least one of the pair of restraint members.

* * * * *